United States Patent
Yamamoto et al.

(12) 
(10) Patent No.: US 6,287,235 B1
(45) Date of Patent: *Sep. 11, 2001

(54) TOROIDAL CONTINUOUSLY VARIABLE TRANSMISSION

(75) Inventors: Takeshi Yamamoto; Toshikazu Nanbu, both of Yokosuka; Yoshiteru Yasuda, Yokohama, all of (JP)

(73) Assignee: Nissan Motor Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,834

(22) Filed: May 5, 1999

(30) Foreign Application Priority Data

May 13, 1998 (JP) .................................................. 10-130468
Sep. 21, 1998 (JP) .................................................. 10-266322

(51) Int. Cl.[7] .................................................. F16H 15/38
(52) U.S. Cl. .................................. 476/41; 476/48; 384/618
(58) Field of Search ........................ 476/41, 48; 384/618, 384/621, 623; 192/93 A

(56) References Cited

U.S. PATENT DOCUMENTS

| 700,145 | * | 5/1902 | Larned et al. ........................ 384/618 |
|---|---|---|---|
| 718,110 | * | 1/1903 | Eveland ................................ 384/623 |
| 718,111 | * | 1/1903 | Eveland ................................ 384/623 |
| 2,057,213 | * | 10/1936 | Skyiepal ................................ 384/623 |
| 2,956,441 | * | 10/1960 | De Brie Perry ........................ 476/41 |
| 2,978,282 | * | 4/1961 | Fisher .................................. 384/623 |
| 3,163,050 | * | 12/1964 | Kraus .................................... 476/41 |
| 3,163,478 | * | 12/1964 | Pitner ................................... 384/623 |
| 3,240,542 | * | 3/1966 | Jahn ..................................... 384/623 |
| 3,778,124 | * | 12/1973 | Alling .................................. 384/623 |
| 5,322,735 | * | 6/1994 | Fridez et al. .......................... 384/618 |

FOREIGN PATENT DOCUMENTS 10-331937 * 12/1998 (JP) .

* cited by examiner

Primary Examiner—David A. Bucci
Assistant Examiner—William C Joyce
(74) Attorney, Agent, or Firm—Foley & Lardner

(57) ABSTRACT

A toroidal continuously variable transmission is provided with a power roller 8 which is gripped between input/output disks 5, 6 arranged on the same axis, a cam flange 2 which is disposed on the same axis as the input disk 5 and is connected to an input shaft 1, and cam rollers 3 which are gripped between the cam flange 2 and the rear face of the input disk 5. Bearings 41, 44, 45 are interposed in the contact position on the long radius end face 3b of the cam roller 3 and the inner circumference of the retainer 4. These bearings allow the reduction of frictional resistance on the contact point of the cam roller 3 and the retainer 4 and improve the torque transmission capacity and component lifespan of the toroidal continuously variable transmission.

4 Claims, 12 Drawing Sheets

TOROIDAL CONTINUOUSLY VARIABLE TRANSMISSION

FIELD OF THE INVENTION

The present invention relates to a thrust generating mechanism for a toroidal continuously variable transmission which is provided in an automobile or other vehicle.

BACKGROUND TO THE INVENTION

Toroidal continuously variable transmissions transmit motive power through an arrangement in which a power roller is tightly held between an input disk and an output disk. Rotations from the input disk rotate the power roller which in turn rotates the output disk as a result of frictional contact.

The transmission of motive power under these circumstances depends on the force of frictional contact between the input/output disks and the power roller. The frictional force in turn corresponds to a thrust force which grips (sandwiches) the power roller. U.S. Pat. No. 2,959,063 discloses a mechanism of generating a thrust force which acts on the input/output disks in order to grip the power roller.

The disclosed mechanism consists of arranging a plurality of cam rollers held in a retainer on the same axis as the input/output disks to generate a thrust force so that the power roller which is gripped between the input/output disks is placed under pressure in proportion to the input torque from the input shaft.

The plurality of cam rollers are disposed on the inner side of the retainer at equal intervals in the radial direction. Each cam roller is formed in an approximately conical trapezoid shape and is disposed so that the long radius end faces outwardly. The end face of each cam roller forms a rounded face which is maintained in contact with the inner face of the retainer.

Due to the fact that the long radius end faces are maintained in contact by the retainer, the cam rollers are gripped between a cam flange(input member), which is a member fixed on the input shaft side, and the rear face of the input disk, which can slide with respect to the input shaft. A cam face, the depth of which gradually decreases towards the circumference, is formed on the opposed faces of the input member and rear face of the input disk. When the input member rotates in response to an input torque, the cam roller displaces through a narrow range along the cam face towards the circumference while rotating. The input disk is pressed in the axial direction from the rear face and, in this way, a thrust force is generated. The thrust force allows the input disk to press the power roller onto the output disk and thus to achieve the transmission of rotational torque.

The conical trapezoid shape of the cam roller allows it to be pressured in the radial direction by the rotations of the input member. As a result, a sliding friction is generated on the metal contact face of the long radius end face of the cam roller and the retainer. Surface pressure acting on the cam roller decreases away from the center of the contact point of the rounded long radius end face with the inner face of the retainer. In this way, the moment of the sliding frictional force which impedes the cam roller from rotating can be minimized.

SUMMARY OF THE INVENTION

However the above alignment does not address the residual problem of the frictional force. The size of the frictional force generates a divergence with respect to set values of the thrust force which grips and pressures the power roller.

Reducing the thrust force when input torque is increasing, results in power roller slip and reductions in the torque transmission capacity of the continuously variable transmission. Conversely excessive thrust force when input torque is decreasing reduces the durability of the input/output disks and the power roller.

The object of the present invention is to improve the transmission capacity and durability of a toroidal continuously variable transmission so that the thrust value of the power roller is close to a set value, by reducing frictional forces which are generated by the retainer and the cam roller.

In order to achieve the above object, the present invention provides a toroidal continuously variable transmission which has a power roller which is gripped between an input disk and an output disk arranged on the same axis. The toroidal continuously variable transmission comprises an input shaft which supports the input disk so as to reciprocate freely, a cam member which is disposed in proximity to the input disk and is fixed to the input shaft, a cam roller which is gripped between the cam member and the rear face of the input disk and is provided with a conical rotating face, and a retainer which is stored so that the cam roller faces the radial direction about the input shaft and a long radius end face is disposed so as to form an outer wall. The toroidal continuously variable transmission further comprises a bearing which is interposed at the contact point of said long radius end face with said retainer in the radial direction of said cam roller.

The details as well as other features and advantages of this invention are set forth in the remainder of the specification and are shown in the accompanying drawings.

DESCRIPTION OF THE PREFERRED EMBODIMENTS

The embodiments of the present invention are described below with reference to the accompanying drawings.

FIGS. 1–4 show a first embodiment of the present invention as adapted to a single cavity toroidal continuously variable transmission.

Figure 1:
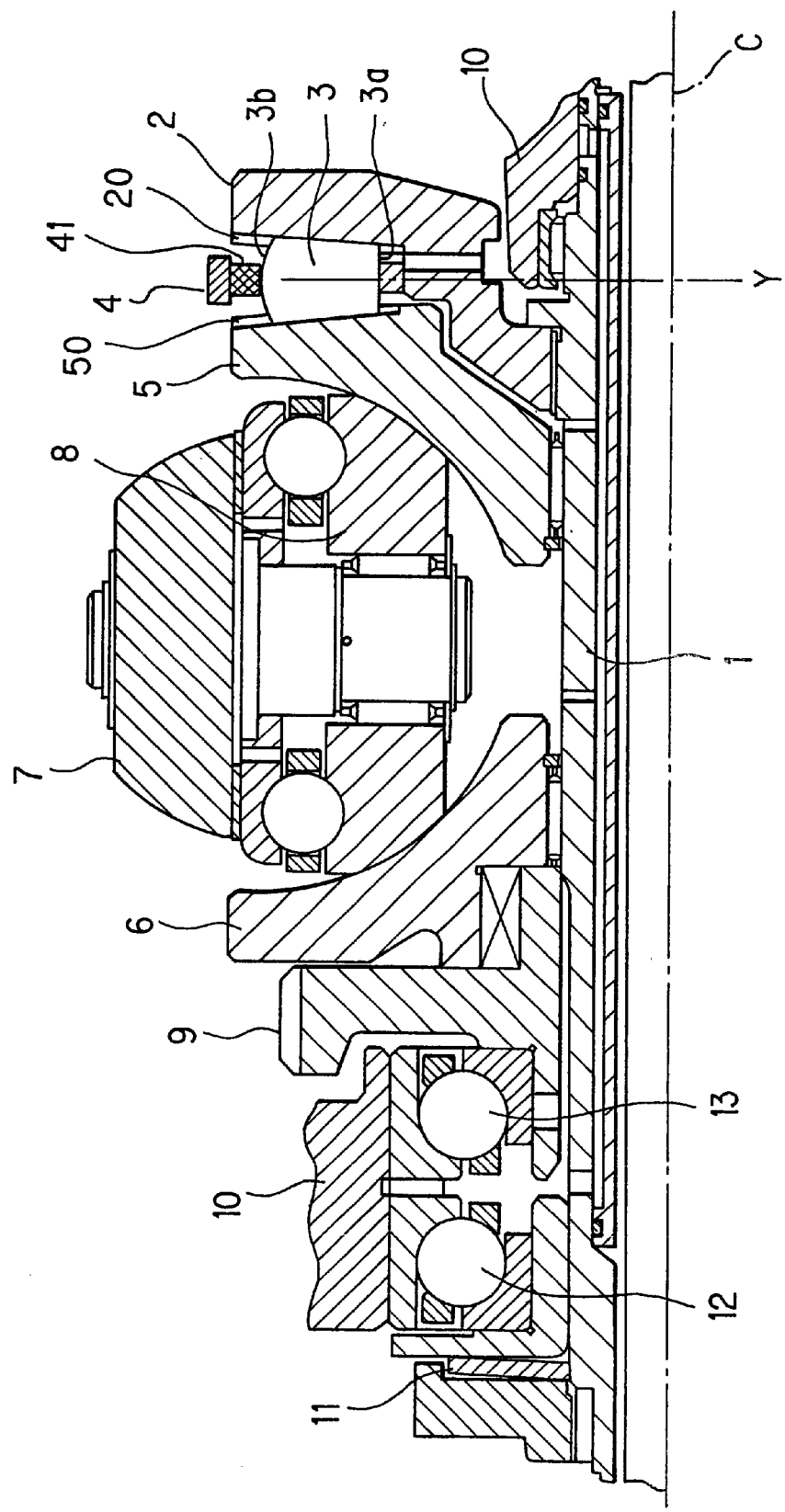
FIG. 1 is a semi cross sectional view of a toroidal continuously variable transmission showing an embodiment of the present invention.

As shown in FIG. 1, an input disk 5 and an output disk 6 which are respectively in the shape of a toroid cone are disposed coaxially with an input shaft 1. The input shaft 1 is axially supported in a casing 10 through a bearing 12.

A plurality of cam rollers 3 and a cam flange 2 which acts as a cam member are disposed on the rear face of the input disk 5. An output gear 9 is disposed on the rear face of the output disk 6.

A set of power rollers 8 which is supported by a trunnion 7 is gripped between the input and output disks 5, 6. The power roller 8 is rotated by the rotations of the input disk 5 and these rotations are transmitted in turn to the output disk 6. The contact radiuses of the input disk 5 and output disk 6 vary in response to variations in the angle of the power roller 8 and the rotational speed transmitted from the input disk 5 to the output disk 6 varies as a result.

Rotational torque transmitted in such a way is determined by the frictional force of contact of the power roller 8 with the input/output disks 5, 6. When the frictional force of contact is insufficient while torque is being transmitted, a slip is generated with the contact face and transmitted torque is reduced. In contrast, when the frictional force of contact exceeds that which is necessary, although a slip is not generated, wear increases which reduces component durability. Thus it is necessary to set the frictional force of contact appropriately depending on the size of the transmitting torque.

As discussed below, a thrust force is generated in response to an input torque by the cam flange 2 and the cam rollers 3. The input disk 5 is pressed by such a thrust force so that the power roller 8 is gripped between the input/output disks 5, 6 thus creating a necessary frictional force and enabling the transmission of rotational torque.

An output gear 9 which is joined to the rear face of the output disk 6 has an axial support in a casing 10 through a bearing 13. The output gear 9 and the output disk 6 can rotate relative to an input shaft 1.

The bearing 12 which supports the input shaft 1 is disposed so as to counterbalance the bearing 13 that supports a thrust force from the cam flange 2 and the cam rollers 3.

In FIG. 1, a plate spring 11 is interposed between a bearing 12 and a nut, which is threadably attached to an input shaft 1 further to the left than the bearing 12. When not under load, the plate spring 11 applies a spring force which draws the input shaft 1 towards the left of the figure. Thus the cam flange 2 is pressed towards the left side of the figure and a pre-load is applied to the input disk 5 in order to grip the power roller 8 through the cam rollers 3.

Although the cam flange 2 above is integrated with the input shaft 1, the input- disk 5 is supported so as to be rotatable relative to and displacable in the axial direction of the input shaft 1. A depressed cam face 20, 50 with a fixed slope is formed on the mutually opposed faces of the cam flange 2 and the input disk 5. The cam rollers 3 which are stored in the conical retainer 4 are gripped between the cam faces 20, 50.

Thus the input disk 5 is rotated by the cam roller 3 in the same direction as the cam flange 2.

Figure 2:
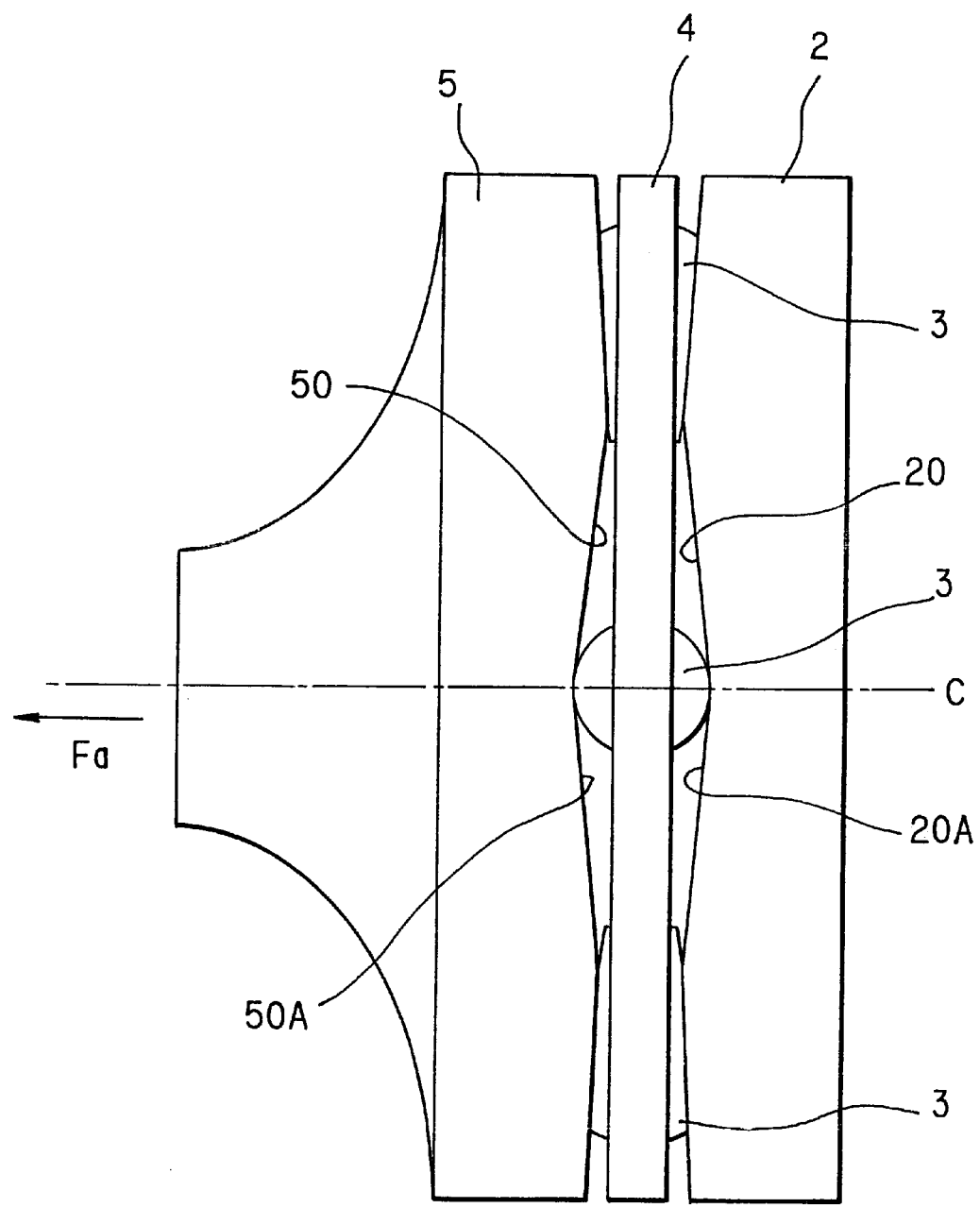
FIG. 2 is a similar lateral view of a cam flange and an input disk.
Figure 3:
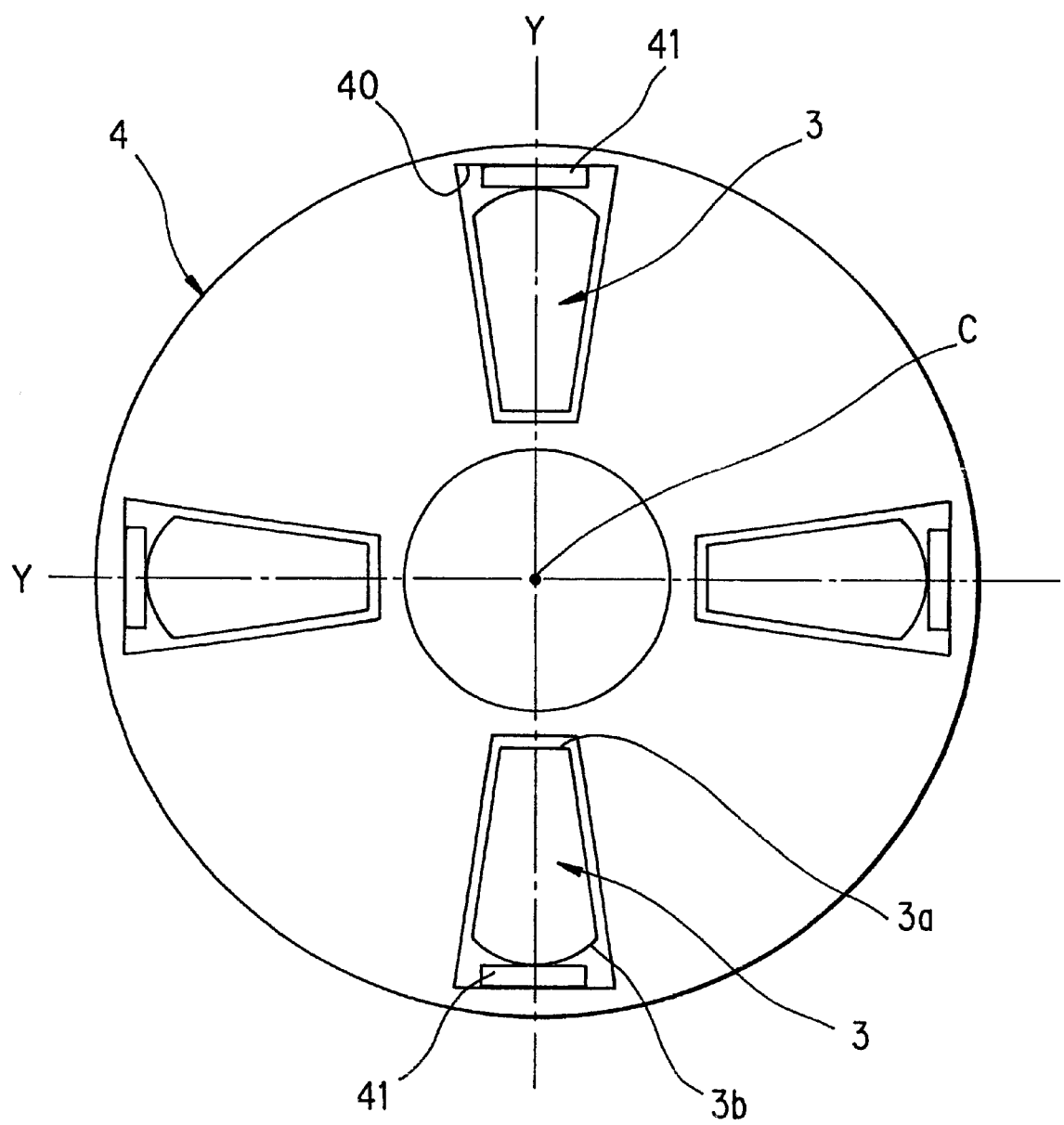
FIG. 3 is a similar front view of a retainer.
Figure 4:
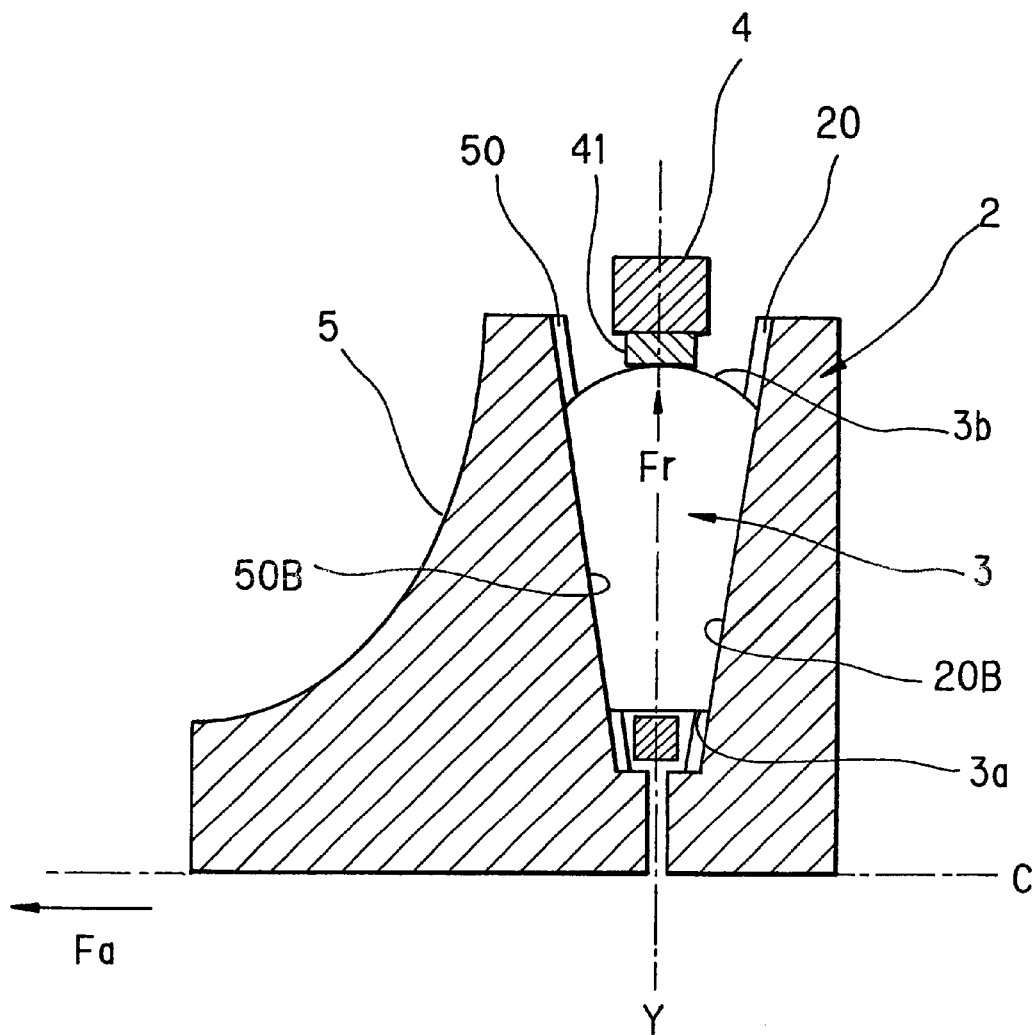
FIG. 4 is a similar partial semi cross sectional view of a cam flange and a cam roller.

As shown by FIGS. 2–4, a taper roller forms the cam roller 3. The short radius face 3a of the taper roller faces the axis C of the input shaft 1. The long radius face 3b of the taper roller faces outwardly. That is to say, it is disposed so that the axis Y corresponds to the radial direction and is stored in the retaining frame 40 which are respectively provided on the retainer 4 at intervals of 90°.

Thus the self-rotation axis Y of the cam roller 3 is orthogonal to the axis C as shown by FIGS. 3 and 4.

The long radius end face 3b of the cam roller 3 is formed as part of a rounded face. A plate shaped bearing 41 is provided which contacts with the apex of the rounded long radius end face 3b on the inner peripheral face of the retaining frame 40. The constituent material of the sliding bearing 41 displays high hardness and a smaller friction coefficient than the constituent material of the retaining frame 40.

The opposed cam faces 20, 50 of the cam flange 2 and the input disk 5 have sloping faces 20B, 50B along the cam roller 3 which are provided with a conical rolling face as shown in radial cross section in FIGS. 1 and 4. The faces are adapted to approach each other to the degree that the radius of rotation of the input shaft 1 is reduced.

As shown in FIG. 2, the cam faces 20, 50 are in the shape of a depression which has sloping faces 20A, 50A the depth of which gradually decreases towards either of the circumferences of the cam flange 2 and the input disk 5. The cam roller 3 is disposed in the deepest part of the depression in an initial state in which no input torque is applied.

In FIG. 2, the cam flange 2 rotates together with the rotations of the input shaft 1. The cam roller 3 has a tendency to rotate (revolve) in the same direction as the cam flange 2. However as the cam roller 3 displaces by rotating about the self-rotation axis Y along the sloping face 20A of the cam face 20, the interval between the cam flange 2 and the input disk 5 widens and the input disk 5 is pressed towards the out put disk 6 along with the axis C of the input shaft 1.

As a result, a thrust force Fa is generated by the cam rollers 3 which press the input disk 5 to the power roller 8. When the input disk 5 can no longer displace in the axial direction, after a small displacement of the cam rollers 3 towards the direction of rotation of the cam flange 2, the rotations of the cam flange 2 are transmitted to the input disk 5 through the cam rollers 3. Furthermore the input disk 5 rotates together with the rotations of the cam flange 2 with a slight phase delay.

The degree of displacement of the cam roller 3 varies in response to the torque which is transmitted to the input shaft 1 and increases with increases as torque increases. As a result, the thrust force Fa increases proportionally.

The upward impelling force acting on the cam roller 3 along the cam face 20 is weakened as the amount of transmitted input torque decreases and so the degree of displacement of the cam roller 3 is reduced. As a result, the thrust force Fa is also reduced.

On the other hand, as the cam roller 3 is in the form of a tapering roller, it is pressed in the radial direction (the self-rotation axial direction Y) by the generated thrust force and presses strongly against the bearing 41 on the inner circumference of the retaining frame 40.

As described above, the cam roller 3 presses the input disk 5 from the rear face while rotating along the cam face 20. Thereafter the cam roller 3 rotates together with the cam flange 2 and rotates the input disk 5. When the cam roller 3 is rotating, the frictional force with the retaining frame 40 creates a resistance which acts in a direction which impedes the displacement of the cam roller 3.

Thus the degree of displacement of the cam roller 3 in the circumferential direction varies on the size of the frictional force. The thrust force generated thereby varies and so the rotational torque transmitted to the output disk 6 through the power roller 8 from the input disk 5 also varies. That is to say, the size of the transmitted rotational torque varies due to the influence of the frictional force.

An analysis of the effect of the frictional force is as shown below.

Figure 9:
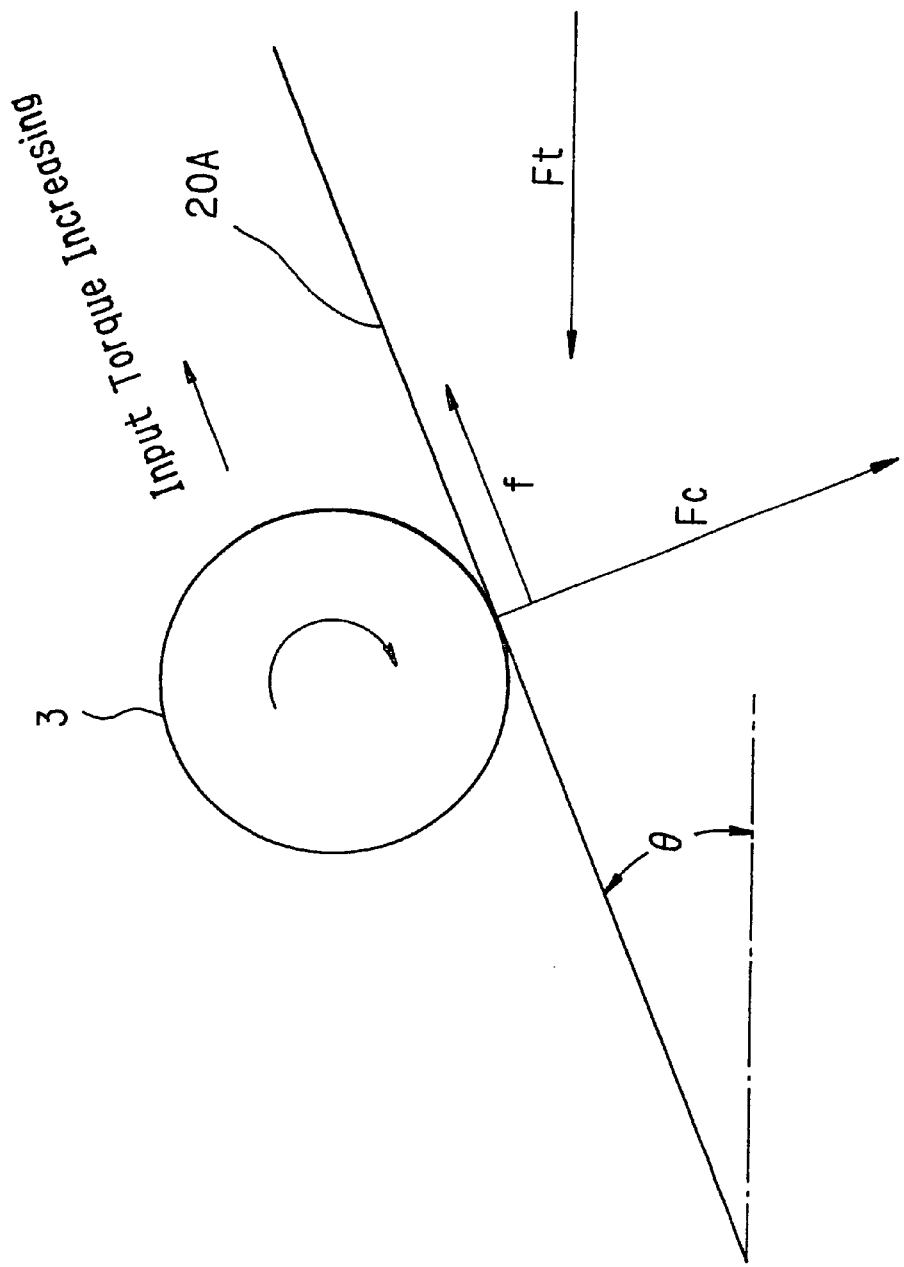
FIG. 9 is a schematic view of the movement of a cam flange and a cam roller during increasing torque.

As shown in FIG. 9, when the input torque is increased and so a rotational force Ft is added on the cam flange 2 by the input torque, a frictional force f and a pressing force Fc in the direction of the normal with respect to the sloping face 20A which contacts with the cam roller 3 are applied. Since the frictional force f and a pressing force Fc along the normal are balanced with the rotational force Ft, when the angle of slope of the cam face 20A is taken to be θ, then $$Ft = Fc \times \sin \theta + f \times \cos \theta \quad (1)$$

On the basis of the above relationship, $$Fc = (Ft - f \times \cos \theta)/\sin \theta \quad (2)$$

Since the thrust force Fa which is applied to the input disk 5 by the cam roller 3 is a component force in the axial direction of the cam flange 2 of the force Fc along the normal as shown above.

$$Fa = Fc \times \cos \theta = (Ft - f \times \cos \theta)/\tan \theta \quad (3)$$

Figure 5:
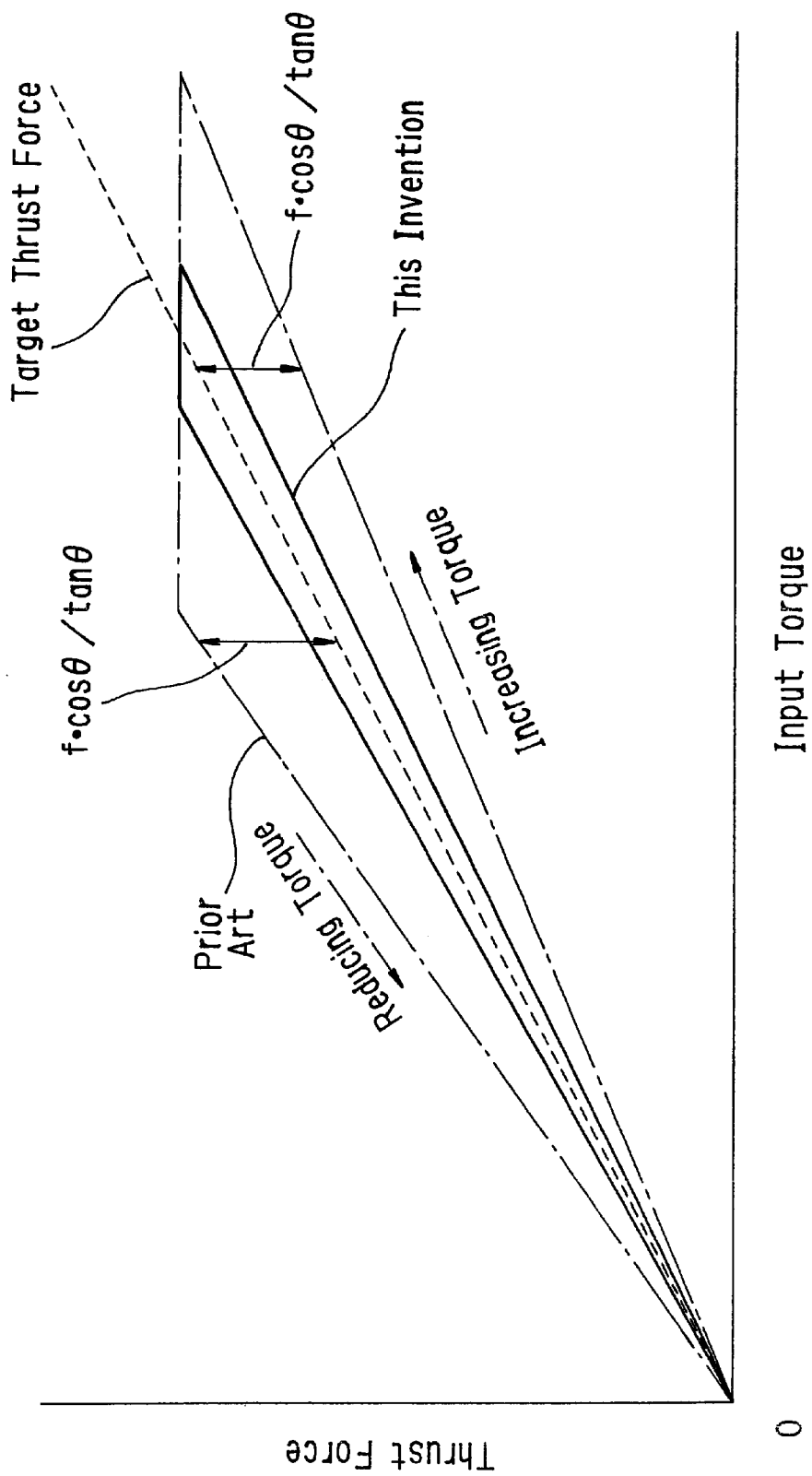
FIG. 5 shows the relationship between the input disk and the thrust force in graphical form.

Therefore when input torque is increased, as shown in FIG. 5, since the actually generated thrust force Fa is only reduced by fcos θ/tan θ with respect to the set value (Ft/tan θ) which is a target value for the thrust force Fa, the actual thrust force Fa for the power roller 8 to transmit torque is reduced.

Figure 10:
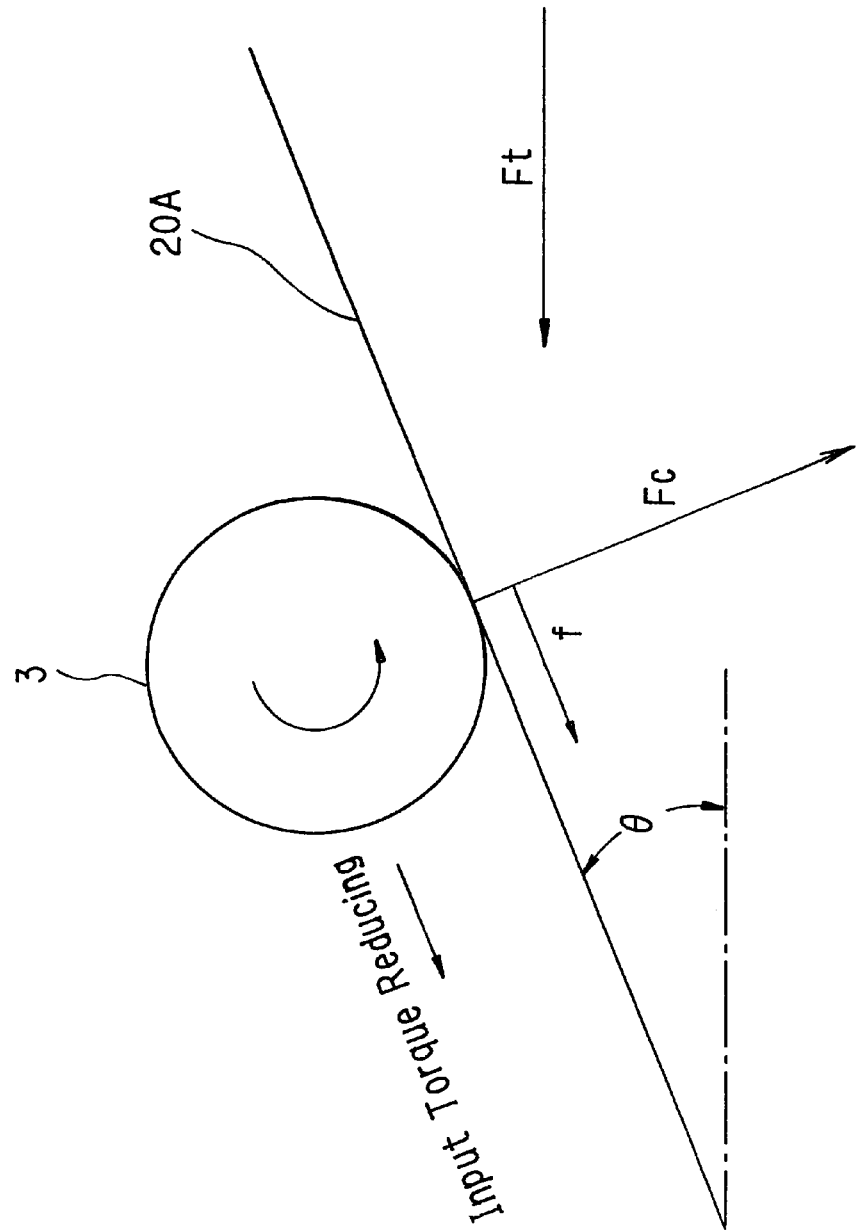
FIG. 10 is a schematic view of the movement of a cam flange and a cam roller during reducing torque.

On the other hand, as shown in FIG. 10, when input torque is reduced, since the direction of the frictional force f is opposite to that when torque is increasing, the thrust force Fa which is applied by the cam roller 3 to the input disk 5 is given by $$Fa = (Ft + f \times \cos \theta)/\tan \theta \quad (4)$$

Thus when input torque is decreased, the thrust force Fa actually generated with respect to a target thrust force Fa only increases by f cos θ/tan θ as shown by FIG. 5. Therefore the thrust force Fa which is pressing on the power rollers 8 increases.

As a result, if the frictional force f above can be reduced when input torque is increased or when it is decreased, the thrust force Fa will approximate the target value to that extent.

Since the self-rotation axis Y of the cam roller 3 is disposed at a right angle to the axial line C of the cam flange 2 and the input disk 5, the component force in the axial direction which acts on the cam roller 3 becomes equivalent to the component force Fr in the radial direction as shown by FIG. 4. The contact point of the long radius end face 3b formed on the rounded cam roller 3 and the retainer side 4 is approximately equal to the self-rotation axis Y and thus is symmetrical to the axis Y. Thus the rotational contact radius becomes smaller and the frictional force is also reduced in size, as rotational contact radius becomes smaller.

A bearing 41 with a small frictional coefficient is interposed between the long radius end face 3b and the retaining frame 40. The frictional force f with respect to the rotation of the cam roller 3 is greatly reduced due to the existence of the bearing 41.

As shown by Equations (3) and (4), the divergence of the thrust force Fa which is actually applied on the input disk 5 by the cam roller 3 and the target set value (F=t/tan θ) is reduced as shown in FIG. 5 due to the fact that the resistance of the frictional force f is reduced.

Thus when input torque is increasing, it is possible to prevent the power roller 8 from slipping as the thrust force Fa is insufficient. Thus the torque transmission capacity of the continuously variable transmission can be improved.

When the input torque is reduced, it is possible to stop the thrust force Fa from exceeding a set value and thus improve the durability of the power roller 8 and input/output disks 5, 6.

Figure 6:
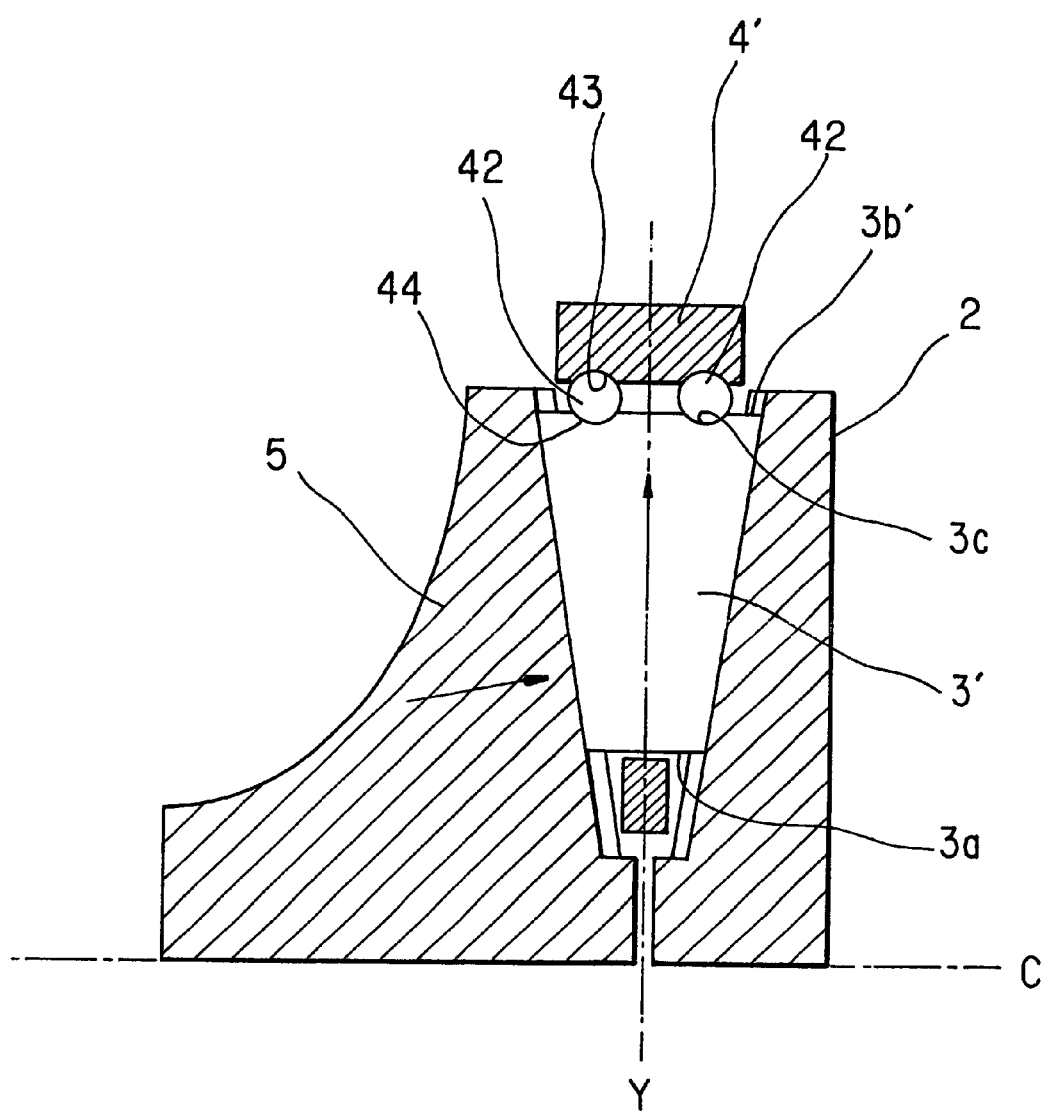
FIG. 6 is a partial semi cross sectional view of a cam flange and a cam roller showing a second embodiment of the present invention.
Figure 11:
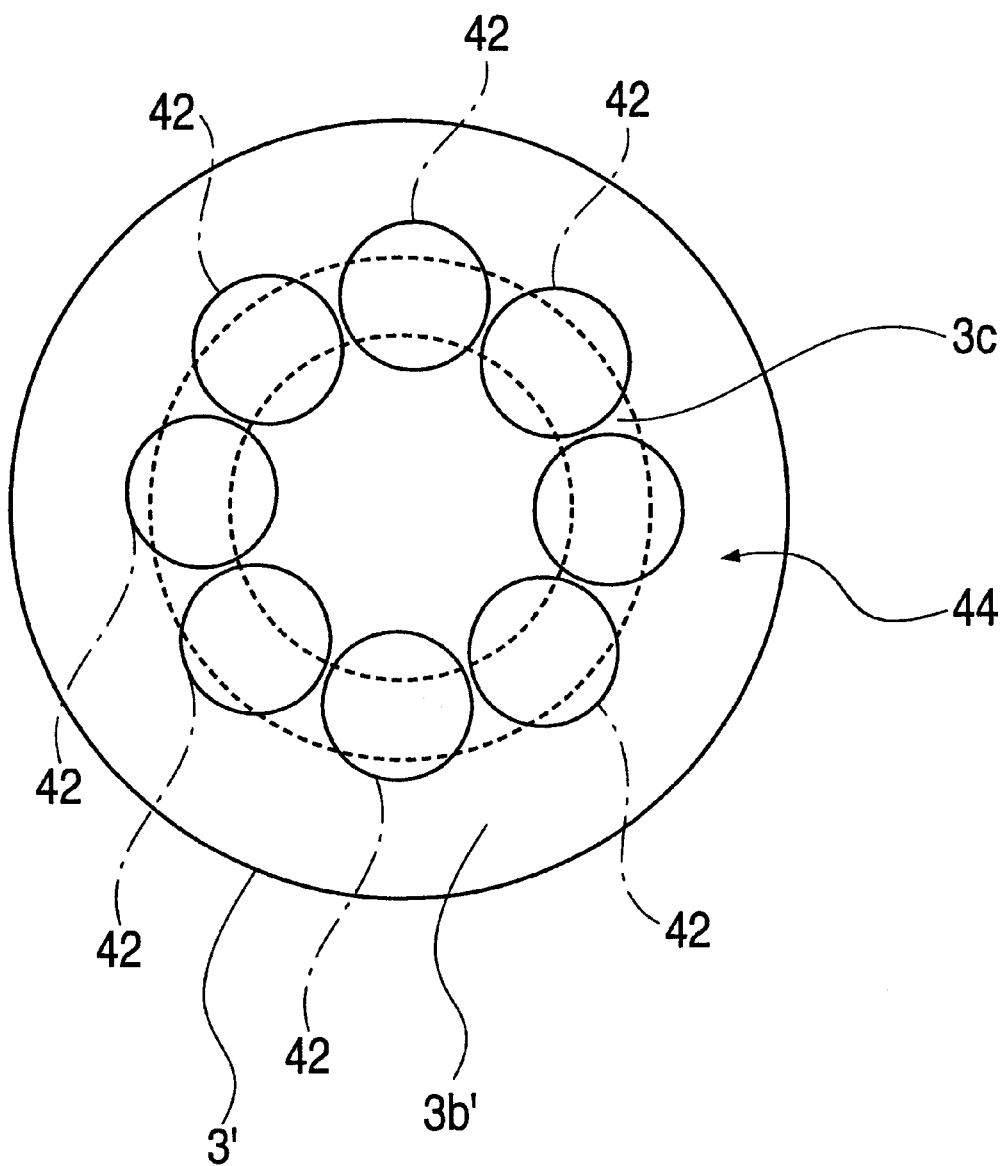
FIG. 11 is a view facing to a long radius end face of the cam roller showing an annular groove formed thereon as the second embodiment of the present invention.
Figure 12:
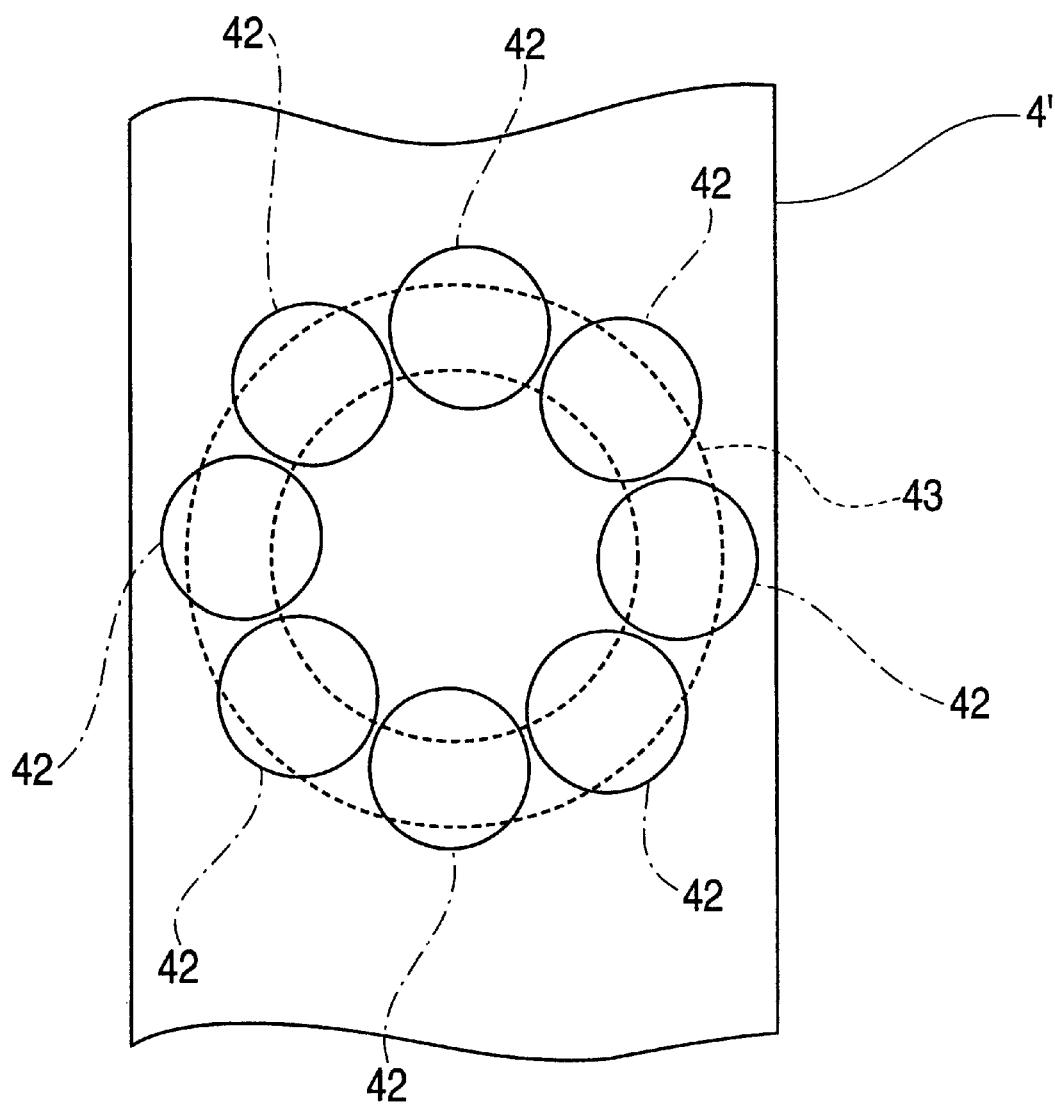
FIG. 12 is a view facing to an inner circumference of a retainer showing an annular groove formed thereon as the second embodiment of the present invention.

FIGS. 6, 11, 12 show a second embodiment of the invention. FIG. 11 is a view facing in the direction from the top to the bottom of FIG. 6, showing a long radius end face of a cam roller. FIG. 12 is a view facing in the direction from the bottom to the top of FIG. 6, showing an inner circumference of a retainer. Except for the fact that the sliding bearing 41 of the first embodiment above has been replaced by a thrust ball-bearing 44, the arrangement is identical to that of the first embodiment.

The long radius end face 3b' of the cam roller 3' is not rounded as in the above, but is flat. A ring shaped orbital face 3c is formed around the self-rotation axis Y. Another orbital face 43 of an equal radius to the orbital face 3c is formed around the self-rotation axis Y on the opposed inner circumference of the retaining frame 40 of the retainer 4'.

A plurality of balls 42 to function as rotation bodies are interposed between these orbital faces 3c, 43 and form thrust ball bearings 44.

When the input torque is varying, the cam roller 3' displaces in the circumferential while rotating. The frictional force f generated between the retainer 4' and the long radius end face 3b' at this time is further reduced by the interposed ball bearings 44.

As a result, the thrust force Fa which depends on the input torque can further approximate the set value and it is possible as a result to improve the torque transmission capacity and the component durability of the toroidal continuously variable transmission. Furthermore wear of the long radius end face 3b' and cam roller 3' is suppressed.

The orbital face which guides the balls 42 may also be only provided on either the retainer 4' or the long radius end face 3b'.

Figure 7:
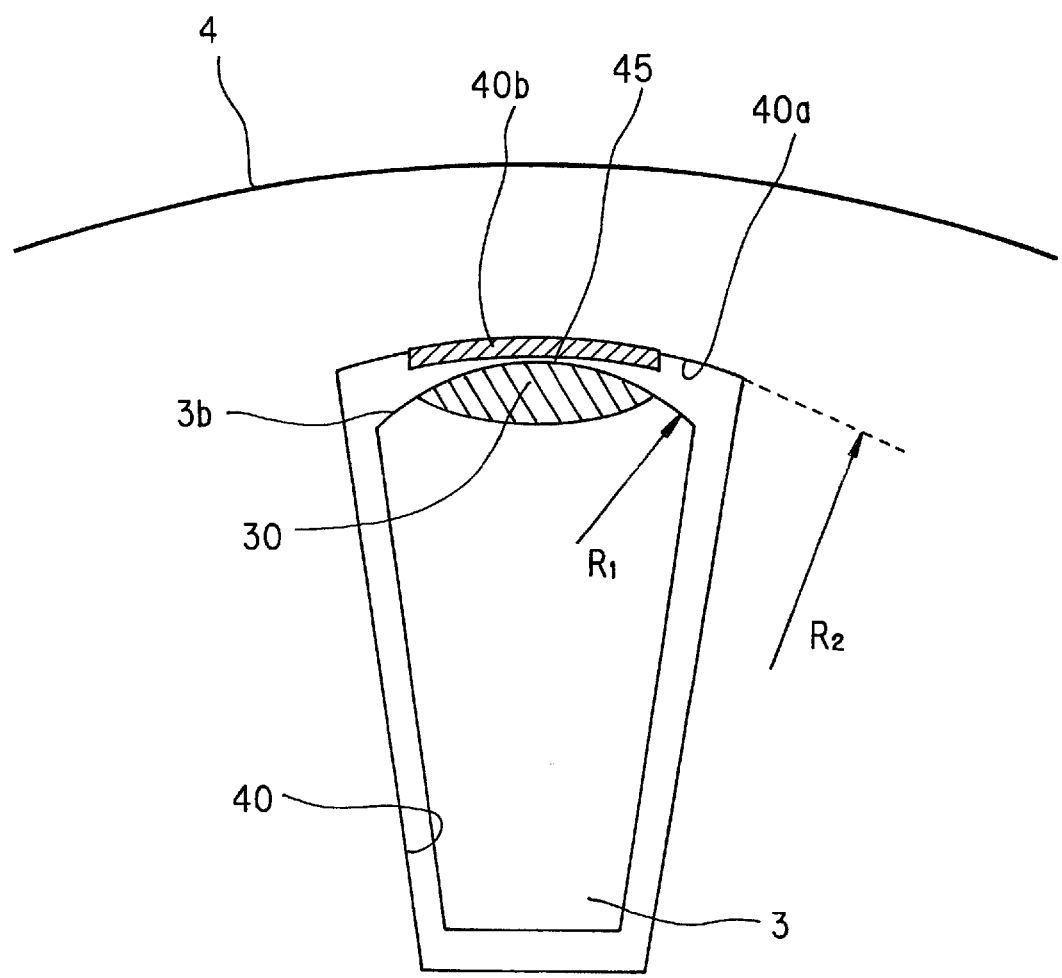
FIG. 7 is a cross sectional view of a third embodiment of the present invention.

FIG. 7 shows a third embodiment of the present invention. In this embodiment, the inner circumference 40a of the retaining frame 40 and the long radius end face 3b of the cam roller 3 contact directly. A low friction coating is formed on the reciprocating position of these components and functions as a sliding beading 45. In other respects, the arrangement is the same as embodiment 1 above.

An inner circumference face 40a provided with a relatively large radius of curvature R2 is formed on the inner circumference of the retaining frame 40 which faces the long radius end face 3b of the cam roller 3. The rounded long radius end face 3b is formed with a fixed smaller radius of curvature R1.

The coatings 30, 40b which are composed of a low frictional coefficient material are respectively formed on the contact portion of the inner circumference 40a and the long radius end face 3b. These coatings may be formed from a ceramic coating such as DLC (Diamond Like Carbon) or the like which has an extremely low frictional coefficient and can form an excellent thin anti-wear layer. The frictional coefficient $\mu$ of the DLC coating in oil is below 0.08.

The relative relationship of the radius of curvature R2 of the inner circumference face 40a and the radius of curvature R1 of the long radius end face 3b is determined on the basis of the equivalent radius of curvature R which is calculated by the Equation below.

$$1/R=1/R1+1/R2 \quad (5)$$

The friction torque (friction loss) of the long radius end face 3b and the inner circumference face 40a is reduced when the equivalent radius of curvature R takes smaller values. On the other hand, when the equivalent radius of curvature R takes larger values, the friction torque (friction loss) of the long radius end face 3b and the inner circumference face 40a increases.

On the basis of experiments, the inventor has found that the relationship of the equivalent radius of curvature R to pressure efficiency shows conspicuous reductions in pressure efficiency values when the equivalent radius of curvature R exceeds 900 mm and the frictional coefficient of the inner circumference face 40a and the long radius end face 3b takes the value $\mu$=0.1.

As shown in FIG. 5, pressure efficiency expresses the ratio of the actual thrust force which is generated depending on the input torque with respect to a set thrust force Fa.

Therefore if the radius of curvature R1 of the long radius end face 3b and the radius of curvature R2 of the inner circumference face 40a is set by Equation (5) above so that the equivalent radius of curvature R is below 900 mm, the frictional loss of the long radius end face 3b and the inner circumference face 40a is reduced and it is possible to generate a thrust force which approximates the set thrust force Fa shown in FIG. 5.

Figure 8:
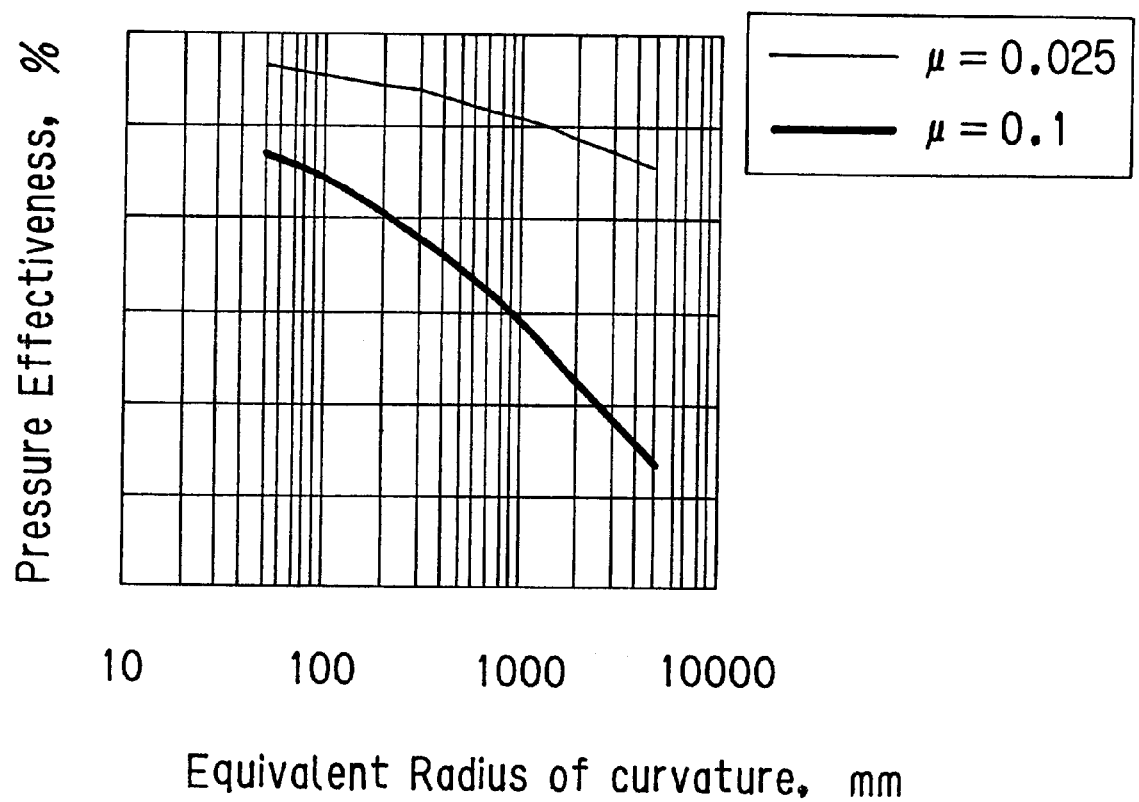
FIG. 8 is a graphical representation of the relationship of the pressure effectiveness and equivalent radius of curvature with the parameter of a frictional coefficient set at $\mu$ wherein the thin line represents $\mu=0.025$ and the thick line represents $\mu=0.1$.

Since the frictional coefficient $\mu$ of the inner circumference face 40a with the long radius end face 3b decreases and the pressure efficiency rises as shown in FIG. 8, the frictional coefficient $\mu$ should be minimized (on the thin line in the figure $\mu$=0.025). However as the large component force Fr in the radial direction is added to the contact section of the inner circumference face 40a and the long radius end face 3b, the anti-wear low friction coating comprised of molybdenum disulfide or the like displays early wear.

The wear resistance of the contact point of retainer 4 and the cam roller 3 is increased by the provision of a coating which displays excellent wear resistant qualities due to high degree of hardness and an extremely low friction coefficient as exemplified by the DLC layer.

Apart from the DLC layer discussed above, it is possible to use such ceramic coatings as TiN (Titanium nitride), TiCN (titaniun carbonitride), CrN (chromium nitride), TiAlN (Titaniun aluminum nitride) as a coating 30, 40b of low frictional coefficient material. The frictional coefficient $\mu$ of the coating in oil of the above materials is the same as a DLC layer at $\mu$<0.08 and can perform both functions of reducing frictional wear and maintaining component lifespan. Of course, apart from the ceramic coatings above, it is possible obtain the same effect as above if the layer has a high degree of hardness and a low frictional coefficient. For example the layer may comprise diamond coating.

In the above embodiment, a layer 30, 40b having a low frictional coefficient was formed on both the inner circumference face 40a and the long radius end face 3b. However it is possible to form such a layer on at least one of the inner circumference face 40a and the long radius end face 3b.

Although the invention has been described above by reference to certain embodiments of the invention, the invention is not limited to the embodiments described above. Modifications and variation of the embodiments described above will occur to those skilled in the art, in light of the above teachings.

The contents of Tokugan-Hei-10-130468 (filed May 13, 1998) and Tokugan-Hei-10-266322 (filed Sep. 21, 1998) are incorporated herein by reference.

The scope of the invention is defined with reference to the following claims.

What is claimed:

1. A toroidal continuously variable transmission having a power roller which is gripped between an input disk and an output disk arranged on the same axis comprising:

an input disk, in a rear face of which a first cam face is formed;

an input shaft which supports said input disk so as to reciprocate freely;

a cam member disposed in proximity to said input disk and fixed to said input shaft, on which a second cam face is formed opposed to said first cam face of said input disk;

a cam roller, which rotates around its self-rotational axis, gripped between said cam member and said rear face of said input disk, and having a conical rotating face and an end face which is positioned at an outer end of said cam roller and which is located closer to said input shaft than outer circumferences of said first and second cam faces;

a retainer in which said cam roller is stored so that said end face faces the radial direction about said input shaft being opposed to an inner circumference of said retainer, wherein an outer circumference of said retainer is located farther from said input shaft than outer circumferences of said input disk and said cam member; and a rotating bearing having an annular groove formed on at least one of said inner circumference of said retainer and said end face around said self-rotational axis of said cam roller and a plurality of balls interposed between said retainer and said end face, which are guided by said annular groove.

2. A toroidal continuously variable transmission according to claim 1 wherein said annular groove is formed on both said inner circumference of said retainer and said end face.

3. A toroidal continuously variable transmission according to claim 1 wherein said self-rotational axis of said cam roller is orthogonal to a rotational axis of said input disk and said cam member.

4. A toroidal continuously variable transmission according to claim 1 wherein said rotating bearing is symmetrical with respect to said self-rotational axis of said cam roller.

\* \* \* \* \*